United States Patent [19]
Baglin

[11] Patent Number: 5,897,704
[45] Date of Patent: Apr. 27, 1999

[54] HARDENED HYDRAULIC CEMENT, CERAMIC OR COARSE CONCRETE AGGREGATE TREATED WITH HIGH PRESSURE FLUIDS

[75] Inventor: Frank Geile Baglin, Reno, Nev.

[73] Assignee: Materials Technology, Limited, Reno, Nev.

[21] Appl. No.: 08/858,415

[22] Filed: May 19, 1997

[51] Int. Cl.$^6$ .................................................. C04B 40/00
[52] U.S. Cl. ...................... 106/696; 106/724; 106/738; 106/740; 106/743; 106/802; 106/823
[58] Field of Search .................................. 106/738, 740, 106/743, 696, 724, 802, 822, 823

[56] References Cited

U.S. PATENT DOCUMENTS

| | | | |
|---|---|---|---|
| 4,992,308 | 2/1991 | Sunol | 427/297 |
| 5,169,687 | 12/1992 | Sunol | 427/297 |
| 5,518,540 | 5/1996 | Jones, Jr. | 106/740 |

FOREIGN PATENT DOCUMENTS 735051  10/1996  European Pat. Off. .

*Primary Examiner*—Paul Marcantoni
*Attorney, Agent, or Firm*—Townsend and Townsend and Crew LLP

[57] ABSTRACT

The properties of cement matrices are improved by one or more of the three processes, which can be performed individually, sequentially, or in any desired combination. In each instance a supercritical fluid is or includes a solvent for one of two (or more) reactants such as a monomer and a polymer initiator. The resulting mixture is infused into the matrix under supercritical conditions. The other reactant is placed into the matrix; for example, by incorporating it in the wet cement paste prior to curing. When the mixture is infused into the matrix, the reactants react and change the cement matrix in predictable, desired ways. The solvent itself may or may not be supercritical, and if it is not, it is mixed with a supercritical fluid, which might or might not be another solvent. In this manner, the inside of the matrix may be coated and/or sealed with a polymer, for example, or the entire cement matrix may be rendered relatively flexible and ductile.

8 Claims, No Drawings

HARDENED HYDRAULIC CEMENT, CERAMIC OR COARSE CONCRETE AGGREGATE TREATED WITH HIGH PRESSURE FLUIDS

BACKGROUND OF THE INVENTION

Hydraulic cement that has set and completely hardened, as well as hardened or fired pottery or ceramic matrices, are porous, brittle and relatively weak. They crack easily and are difficult to permanently repair. In fact, replacement is generally the best and most frequent alternative.

Two different techniques have in the past been attempted to improve their physical properties. The first is to modify the wet paste prior to hardening or firing by incorporating liquid "modifiers", particulate admixtures or fibrous reinforcement. The second alternative uses chemicals (generally liquids) to surface-coat or to migrate into the hardened matrix material. Similarly, after crack development or breaking, adhesives and fillers which may or may not slightly penetrate into the matrix may be employed for repair, to form bridges between the edges of cracks or to inhibit further crack propagation. Another method, where there is surface spalling, pothole development or the formation of large cracks, fills the damaged areas (either with or without the removal of loose debris) with specialized concrete, cements or mortars. These solutions have not been particularly successful in creating or repairing cementitious materials in ways that either restore them or leave them suitable for high-performance applications where tensile strength, resistance to new or further cracking or breakage, flexibility or ductility are desirable properties.

For purposes of this application, the word "cement", used alone or in combination with other words, refers to any type of cementitious material made with water and one or more inorganic ingredients to form a paste which, through reactive processes, creates hydrogels to bind it together. The definition includes, but is not limited to, ceramics, pottery, clay, mud, earthenware, portland, natural and fly-ash pozzolan, lime, gypsum, cementitious materials and the like.

Problems are also encountered with the sand and/or coarse aggregates (typically of an average size between ⅜" and 3½") in cement matrices to form concrete or mortar. Many sands and coarse aggregates exhibit properties and behaviors similar to those of hardened cement, pottery or unfired or fired ceramic matrices. In addition, certain coarse concrete aggregates, particularly zeolites and dolomites, may react with the hydraulic cement that binds them together in concrete and mortar. Aggregates having high levels of porosity and low strength also cause problems. Thus, many commonly occurring aggregates are banned from use in concrete because of such problems.

Chemistry, morphology, geometry and micro-morphology of hardened man-made matrices and natural aggregate determine how aggressively decomposition reactions proceed, often as a consequence of alkali/silica reactions (ASR). To ameliorate some of these problems, aggregates have been soaked in water, salts, acids or even strong alkalis, but the results have been inconsistent and often disappointing. Thus, when a local aggregate is unacceptable for use in concrete, suitable aggregate must either be imported or man-made, often at considerable expense.

The present invention seeks to alleviate problems of this kind by treating natural or man-made cement and/or aggregates with supercritical fluids to alter their surface, surface layer, and in some cases their entire body chemistry and/or microstructure.

As is well known from the literature, every pure substance has a certain, temperature/pressure threshold, above which, when simultaneously exceeded, all the properties of the substance continuously change without exhibiting any gas/liquid phase discontinuity. These are known as the "critical pressure" and "critical temperature" ($T_c$ and $P_c$) of a pure substance. The combined critical pressure and critical temperature threshold is called the "critical point" of a pure substance. A substance or mixture that has been elevated above the critical point is "supercritical". The term "supercritical fluid" refers to substances, mixtures and solutions which are in this state. Supercritical pure substances, mixtures and solutions exhibit varying degrees of solvent behavior and reactivity with other elements and compounds.

As is disclosed in U.S. Pat. No. 5,518,540, issued May 21, 1996 (the "'540 patent"), the disclosure of which is incorporated herein by reference, when a hardened, porous cement or ceramic matrix is exposed to supercritical carbon dioxide ("scCO$_2$"), alone, the scCO$_2$ infuses into the matrix and causes chemical and microstructural changes that can produce desirable properties and behavior in the matrix.

SUMMARY OF THE INVENTION

The present invention carries the invention disclosed in the '540 patent further and uses or combines selected supercritical substances, mixtures and solutions, usually gases or liquids, but not necessarily limited thereto, in many instances without but if desired also with CO$_2$, either supercritical or non-supercritical CO$_2$, to improve the hardened hydraulic cement, pottery, ceramic and the like, as well as coarse aggregate matrices, in certain desirable and predeterminable ways.

To achieve this, the present invention employs one or more of three different process paths to enhance the characteristics of the matrix. One is to react the matrix or previously infused materials with a supercritical fluid. The second is to use the supercritical fluid as a solvent to carry materials into the interstices of the matrix and deposit them there and/or cause them to chemically react with compounds forming or previously infused into the matrix to produce predictable, desired changes. The third alternative is to use the supercritical fluid as a solvent to dissolve and extract materials from the matrix, itself, or to extract materials previously infused into or created as reaction products within the matrix. The three alternatives may be used separately, sequentially or simultaneously to modify the hardened material. When used in combination, the order of their use may also be varied. Further, repetitive, sequential exposure may be employed to permit the infusion of selected compounds into or their extraction from the matrix. Table 1 illustrates possible combinations of these processes.

TABLE 1

|  | Reaction | Infusion | Extraction |
| --- | --- | --- | --- |
| Method 1 | XX | | |
| Method 2 | XX | XX | |
| Method 3 | XX | XX | XX |
| Method 4 | XX | | XX |
| Method 5 | | XX | |
| Method 6 | | XX | XX |
| Method 7 | | | XX |

Any or all of the three supercritical process paths described above may be performed in closed reaction vessels and/or under normal atmospheric conditions, typically by using spray nozzles such as those described, for example, in U.S. Pat. Nos. 5,336,869 and 5,482,211. The class of devices discussed therein, and others, and appropriately scaled, are suitable for the delivery of supercritical fluids to be used as reagents, infusion solvents or extraction solvents. The penetration of the supercritical fluid into the hardened matrices is a function of the pressure and duration of the supercritical exposure as well as equilibria established during any reaction and/or infusion processes.

A key feature of the present invention is to infuse into or extract from cement matrices such things as pulverulent plastic or metal suspensions, metallic or organic solutions, water, and organic and/or inorganic molecules, for example, to improve, coat or otherwise alter the properties of the hard "skeletons" of cement, rock or aggregate in a desired manner. This may but need not be combined with a carbonation of the hardened matrix to produce the changes discussed in the '540 patent or outlined by the following reaction stoichiometries listed and other, similar reactions:

$$3CaO \cdot 2SiO_2 \cdot 3H_2O + 3CO_2 \rightarrow 3CaCO_3 \cdot 2SiO_2 \cdot 3H_2O$$

$$3CaO \cdot SiO_2 + 3CO_2 + \mu H_2O \rightarrow SiO_2 \cdot \mu H_2O + 3CaCO_3$$

$$2CaO \cdot SiO_2 + 2CO_2 + \mu H_2O \rightarrow SiO_2 \cdot \mu H_2O + 2CaCO_3$$

$$Mg(OH)_2 + CO_2 \rightarrow MgCO_3 + H_2O$$

$$3MgO \cdot 2SiO_2 \cdot 3H_2O + 3CO_2 \rightarrow 3MgCO_3 \cdot 2SiO_2 \cdot 3H_2O$$

$$3MgO \cdot SiO_2 + 3CO_2 + \mu H_2O \rightarrow SiO_2 \cdot \mu H_2O + 3MgCO_3$$

$$2MgO \cdot SiO_2 + 2CO_2 + \mu H_2O \rightarrow SiO_2 \cdot \mu H_2O + 2MgCO_3$$

According to this invention, at least one or a combination of solutes other than supercritical $CO_2$, usually selected from those which are gaseous or liquid at ambient room temperature and pressure, is selected. This substance or combination of substances is heated and pressurized to above the critical point for one or more of the substances. Since binary or ternary systems have critical points for each of their constituencies, and since each of the constituencies evokes different solvent properties and degrees of reactivity under supercritical conditions, it is possible to formulate combination substances with unique behaviors relative to the matrix to be treated to give the matrix the desired characteristics.

For example, one constituent of a combination or mixture of substances may have a strong quadruple, like $CO_2$, while another constituent, such as propene ($C_3H_6$), might exhibit a strong dipole moment. This combination is highly polar and exhibits a strong affinity for polar substances. So long as they do not react unfavorably with one another, third or even fourth or fifth substances—there really is no practical limit known at this time—may be included in the combination substance or mixture to change additional properties and/or behaviors of the matrix. Since the properties, molecular dynamics and chemical kinetics of supercritical binary and ternary mixtures and solutions are generally well known and documented in the literature, the appropriate substance or mixture of substances to accomplish the objective of infusion or extraction into or from the matrix can be readily selected.

It is, therefore, an object of this invention to provide a method for improving hardened cement or ceramic matrices, sand, gravel and/or coarse aggregates by treating them with a single or a combination of supercritical fluids that react with them and/or infuse solutes, reagents or suspensions into them and/or extract reaction products, solutes or suspensions from them.

More particularly, it is a principal purpose of this invention to utilize supercritical fluids to induce polymerization interior of the outer surfaces of the matrix by infusing a polymer initiator into the hardened matrix to polymerize monomers and similar materials which were incorporated into the initial wet paste prior to hardening and/or placed into the pores and capillaries of the matrix by infusion after hardening, regardless of whether or not supercritical fluids were used as infusion solvents in the placement of such monomers and similar materials prior to the supercritical infusion of the polymer initiator. Conversely, it is also a purpose of this invention to use supercritical fluids to induce polymerization by infusing monomers and similar materials into the hardened matrix to react with a polymer initiator incorporated into the initial wet paste prior to hardening and/or placed into the pores and capillaries of the matrix by means of infusion after hardening, regardless of whether or not supercritical fluids were used as infusion solvents in the placement of such polymer initiators and similar materials prior to the supercritical infusion of the monomers and/or similar polymer precursors.

It is also a purpose of this invention to improve by reaction, infusion and/or extraction, hardened hydraulic cement, ceramic matrices or large aggregates by using supercritical $CO_2$ in combination with other supercritical substances (usually gases or liquids when at room temperatures [ca. 33° C.] and sea-level atmospheric pressures [1 bar], but not limited to such liquids or gases) alone, and/or with additional materials (including, but not limited to, water, conventional solvents and/or reagents), which are either above or below their critical points.

It is likewise a purpose of this invention to improve by reaction, infusion and/or extraction, hardened hydraulic cement, ceramic matrices, large aggregates, and the like by using supercritical substances, other than supercritical $CO_2$, including or not including non-critical (gas-, liquid- or solid-phase) $CO_2$, alone or in combination with additional materials (including, but not limited to, water, conventional solvents and/or reagents), either above or below their supercritical points.

DESCRIPTION OF THE PREFERRED EMBODIMENTS

The process of the present invention can be advantageously employed for producing numerous changes in the micro-morphology and properties of hardened and semi-hardened cementitious or hydraulic cement matrices. For convenience, such hardened and semi-hardened matrices are at times referred to in this application as "Chemically Bonded Ceramics" or "CBC". By using the three process alternatives or pathways (reaction, infusion, extraction) singly, sequentially or in combination, a matrix can be changed either during or, more typically, after the hydrating cement paste or concrete has been changed (e.g. by casting, molding, extruding or pultruding, and the like).

Table 2 lists some representative and for purposes of the present invention relatively more practical substances for use under supercritical conditions, and their relevant properties. Table 2 is merely illustrative and is not a comprehensive or complete list of substances which can be used in the practice of this invention. The substances may be used alone or in combination, depending upon the solvent properties or reactivity with the matrix that is required to achieve a particular result. The critical temperature tie-lines of binary and ternary mixtures is well understood and can usually be calculated (see McHugh, M. A., Krukonis, V. J., "Super Critical Fluid Extraction", 2nd Ed., pp. 29–187, Butterworth-Heineman, 1994).

TABLE 2

| Substance | $T_c$/K | $P_c$/MPa | Dielectric Constant | Dipole Moment |
| --- | --- | --- | --- | --- |
| Carbon Dioxide ($CO_2$) | 304 | 7.38 | 1.00092 | 0 |
| Methane ($CH_4$) | 191 | 4.60 | 1.00081 | 0 |
| Ethylene ($C_2H_4$) | 282 | 5.04 | 1.00134 | 0 |
| Propane ($C_3H_8$) | 370 | 4.25 | 1.00200 | 0.084 |
| Propene ($C_3H_6$) | 365 | 4.60 | 1.00228 | 0.366 |
| Sulfur Hexafluoride ($SF_6$) | 319 | 3.77 | 1.00200 | 0 |
| Nitrogen ($N_2$) | 126 | 3.39 | 1.000580 | 0 |

As is known from the '540 patent, the treatment of cement matrices with $scCO_2$ leads to a reaction between $CO_2$ and $Ca[OH]_2$ and promotes the formation of calcite, vaterite, aragonite or other polymorphs of calcium carbonate.

The properties of cement matrices can also be altered in other ways, as is shown by the representative reactions summarized earlier. Supercritical fluids other than $CO_2$, as well as non-supercritical fluids, may also be used as a non-reactive solvent to carry a solute into or to extract a substance from a hardened matrix. When non-supercritical fluid(s) is(are) used, it, including any solute and/or particle suspension therein, is mixed with a supercritical fluid, which frequently will not be $scCO_2$ but may also include $scCO_2$.

Another feature of the invention is that it permits the manufacture of CBC matrices with superior, heretofore unattainable characteristics in an economically and environmentally sound manner by using, to the extent possible and available, waste stream products such as fly ash, bottom ash, electric arc furnace dust, quarry dust, mine tailings, certain filter cakes such as amorphous silica, calcium aluminate slag (produced during the processing and manufacture of tungsten), and similar materials. Such materials are inexpensive. Their consumption in accordance with this invention may save disposal and/or clean-up costs and is environmentally highly beneficial in that it reduces the release of pollutants.

For example, in an exemplary and preferred embodiment, fly ash from coal-fired electrical power plants is used to generate additional CaO in the fly ash and more $CO_2$ flue gas by adding $CaCO_3$ (calcite) to the coal feed. Calcium oxide mixed with pulverized fly ash (for example, pulverized in a liquid nitrogen thermal shock process to reduce the ash particle size) can be used in combination with a 5% $H_3PO_4$ solution to produce a hard new CBC which can be treated with the $CO_2$ of the flu gas as a supercritical fluid in a mixture with another major flu gas component, $N_2$, and/or other gases to give the CBC desired characteristics.

This embodiment of the invention is significant because it uses waste from the generation of electric power to make and treat CBC, for example in the form of blocks, wallboards, railroad ties, etc., as well as many other finished products. In addition, a portion of the electric power can be used to prepare liquid nitrogen, or liquid $NH_3$. The latter, when combined with S as $SO_2$ or $SO_3$ yields fertilizer $(NH_4)_2SO_4$ ammonium sulfate. In the case of low sulfur coal, cool liquid $NH_3$ can be directly injected into the soil to increase crop yield.

Indeed, $CO_2$ from effluent gases does not even have to be dried, so that polar $H_2O$ molecules can be employed to carry high dielectric additives into the CBC matrix. For an average type I cement, for example, the decrease in $CO_2$ emissions from such a process has an environmentally impressive impact because 2000 lbs. of portland CBC will consume about 1000–1100 lbs. of $CO_2$ from the flu gases. The use of "wet" or damp $CO_2$ makes it possible, for example, to carry water soluble acrylic monomers into the CBC to change its color, thereby acting as an internal paint.

In another embodiment, ~3% hydrogen peroxide can be introduced into the fly ash along with CBC initiators (e.g. oxides, hydroxides, phosphoric acid) to produce a very light-weight, usually less darkly colored, foam-like, untreated pozzolanic matrix (which has a much higher silicon content than most portland CBC). After supercritical $CO_2$ ("$scCO_2$") treatment, the hardened CBC matrix can be used as a light-weight cement aggregate additive.

A fluid may also be chosen which has both reagent and solvent properties. Using the solvent properties of the fluid, polymer initiators can be transported into a fully hardened (hydrated) matrix containing monomers to polymerize them in place. A few exemplary monomers and polymer initiators are listed in Table 3, which is illustrative and is not intended to be complete or comprehensive.

TABLE 3

| Monomer | Polymer | Initiator | Temp. Range (°C.) |
| --- | --- | --- | --- |
| Ethylene | polyethylene | benzoyl peroxide | 40–90° |
| Vinyl Chloride | polyvinyl chloride | t-butyl peroxide | 80—150° |
| Vinyl Acetate | polyvinyl acetate | sec-butyl-peroxy-Carbonate | 15–60° |
| Styrene-butadiene and dicyclopentadiene | rubber | vanadium halides ($VCl_3$, $VCl_4$, etc.) | 20–30° |

Another embodiment of the invention of particular interest is the preparation of a pozzolanic fly ash via the CaO/5% $H_3PO_4$ route by including vanadium chlorides ($VCl_3$, $VCl_2$, $VCl_4$, etc.) in the matrix. Styrene, butadiene and dicyclopentadiene are added to the $scCO_2$ stream, and in principal enough aluminum sites are present in the pozzolanic CDC to yield a structure having rubber-like characteristics (see "Advanced Inorganic Chemistry", F. Albert Cotton and Geoffrey Wilkinson, Interscience publishers of John Wiley and Sons, N.Y. (1972) 794 ff., for a more general discussion of cement matrices having such characteristics). This is an adaptation of the well-known Ziegler-Natta polymerization process and, assuming the proper geometry of the original matrix, can be made to yield cements that are flexible and ductile.

Extraction can also be used to remove materials that were earlier infused into the matrix, or which result from reaction processes with a supercritical fluid or chemical solvent.

For optimal process conditions, control and termination, it is important to know or determine the necessary parameters for achieving the desired reaction and/or mass transport in or through porous structures. This can be done experimentally by determining the extent of penetration, reaction, infusion and/or extraction, or mathematically as is generally discussed in references (1) through (8), for example, in the Listing of References at the end of this application. A particularly attractive way of mathematically making this determination is by employing Bruggeman's effective-medium-approximation ("EMA") (Bruggeman, D. A. G., Annl. Phys. 24, (1935) 636).

According to Bruggeman, when a CBC sample is reacted with $CO_2$ in coordination with other gases or additives, the reactivity, $R_a$, in a reactive gas-porous system varies directly with the square of the gas pressure and the first power of the permeability K (or the porosity ø) and inversely with the $scCO_2$ viscosity (which, the inventors believe, probably acts more liquid-like than as a gas). Thus, a higher temperature T decreases the viscosity 72 and increases the reactivity $R_a$. The principal driving force in this reactive EMA model is the exothermicity of the $CO_2$ in the mixed gas fluid or the $CO_2$-additive reaction.

The permeability K (the volume fraction of pore space) assumes a random pore distribution size, and it is further assumed that the various components of the cement are homogeneously distributed, i.e. all species are isotropic in the CBC solid.

Other assumptions underlying Bruggeman's approximation are that the reaction is not a gas-solid phase reaction, but an aqueous phase reaction, because $CO_{2(g)}$ will not react with a bone-dry CBC sample, that water produced by the reaction carries the heat of neutralization reaction away, and that a finite concentration of $H_2CO_{3(aq)}$ (or $H^+(aq)+HCO^-_3$ (aq)) is always present.

The overall net chemical reaction is well-known, i.e. $Ca(OH)_{2(CBC)}+CO_{2(g)} \rightarrow CaCO_{3(CBC)}+H_2O+\Delta H_{RX}$ where the subscript CBC indicates the solid-gel-solution phase (a solid) of the CBC and $\Delta H_{RX}$ is the enthalpic heat of reaction. The water in this reaction is from the CBC matrix and the $CO_2$ is $scCO_2$ so that it does not liquify or solidify (T)32° C.(90° F.) and P ) 72 atm (1058 psi)) and readily penetrates the matrix.

The $Ca(OH)_2$ is dissolved from the CBC matrix, which liberates 56 kilojoules of heat per mole of water formed (56 kJ/mol), or a total of 112 kJs per mole of calcium hydroxide as the enthalpy of reaction. As part of the overall reaction, free $Ca^{2+}_{(aq)}$ reacts at or near its CBC matrix site with bicarbonate ion to form calcium carbonate (calcite).

The EMA model can also be applied to non-reactive solvent gas and non-reactive solute additives. In one embodiment, the CBC matrix is first reacted with $scCO_2$, as is discussed in the '540 patent. A styrene-butodiene polymer is then dissolved in $SCCO_2$ and the mixture is infused into the already $CO_2$-treated CBC matrix. Alternatively, polymerized rubber is applied to the outside of an already $scCO_2$-treated CBC matrix. The polymer is then dissolved in $scCO_2$ and the mixture is infused into the matrix. In either case, a simple mass transfer of the polymer occurs. The application of the $scCO_2$-polymer mixture may have Ar gas added to it to increase the diffusivity of the mixture. In such a system, it can be assumed that the concentration, C, of the polymer is carried by the solvent gas ($scCO_2$) as a scalar invariant, the pressure P is a scalar invariant, and the diffusivity D is scalar, while the porosity and CBC matrix components are isotopically distributed.

The EMA approach also demonstrates that in this situation no chemical reaction takes place; hence the reactivity $R_a=0$ and there is only mass transport of the polymer in the CBC.

The EMA approach also demonstrates and the physical examination of samples confirms that the rate of polymer transfer is substantially proportional to the porosity, concentration and negative pressure gradient in the CBC matrix and inversely proportional to the $scCO_2$ or mixed gas viscosity. If the polymer density and $scCO_2$ are at high enough pressure, the viscosity of the very dense gas may be approximated as a dense fluid (liquid) and increasing the temperature T will increase the disappearance of the solute into the CBC. It is therefore possible to use mixed transport gases to carry solid, liquid or gaseous additives into the CBC matrix.

Thus, the CBC structures can be treated with $scCO_2$ (or another, non-$CO_2$ supercritical fluid) in combination with other solid, liquid or gaseous additives (e.g. polymer, liquid monomer followed by polymerization initiator or $N_2$-$scCO_2$ gas mixture, respectively) to achieve desired objectives.

The penetration of substances and materials resulting in the form or as part of a supercritical fluid over time and for a given fluid density is principally determined by the pressure, the temperature at the exposed CBC surface, the CBC porosity, and the viscosity of the fluid. It can be predetermined experimentally or mathematically (employing EMA or another suitable technique) to establish process parameters which can be used to monitor and control commercial (mass) manufacturing operations.

Another embodiment of the invention is particularly adapted for concrete structures requiring reinforcing bars ("rebars") such as highways or buildings. Steel pipe with a large number of small cracks or holes extending through the pipe is substituted for the rebar. The pipes are placed so they extend to the outside of the concrete forms, and they are connected to create a network within the concrete in the forms. After the concrete has set, $scCO_2$ is pumped through the pipe network while maintaining a constant pressure so that the $scCO_2$ penetrates into the concrete until the desired calcite reaction is completed. The inside and the areas immediately outside the pipes can then be protected from the lowered pH CBC surrounding the pipes with an in situ polymerization (e.g. vinyl chloride followed by the initiator t-butyl peroxide). An alternative is to simply pump a standard and very alkaline CBC paste (without aggregate) into the pipes to increase the alkalinity in the immediate area and provide a passive layer adjacent to their surfaces.

Polymerization can also be initiated in the matrix, by including a polymer precursor in the wet cement paste, allowing the formed product to harden, and then transporting into it a polymer initiator dissolved in a supercritical fluid solvent.

It is, therefore, possible to practice the present invention with virtually any combination of supercritical fluids subjecting new or old hardened cement matrices to the fluids, to bind concrete together or to form finished goods of all manner and descriptions. The following are a few examples how the present invention can be employed to produce specific products.

For example, broken concrete can be repaired by heavily coating it with a vinyl acetate solution that is allowed to dry. A stream of supercritical pentane is then applied with a spray nozzle to dissolve the vinyl acetate and drive it into the matrix, permeating deeply into the cracks and pores and depositing the vinyl acetate there. A supercritical spray of a mixture 50% carbon dioxide and 50% propene in which sec-butyl-peroxy-carbonate is dissolved is then driven into the matrix to initiate polymerization of the vinyl acetate and form polyvinyl acetate. The sections of the damaged concrete matrix are thereby joined together and incorporated into the polymer matrix.

Listing of References

[1] Mason, E. A., Malinauskas, A. P., "Gas Transport in Porous Media: The Dusty Gas Model", 1983

[2] Krishna, R., Chemical Engineering Science, No. 45, p. 1779, 1990

[3] van den Broeke, L. J., Krishna, R., Chemical Engineering Science, No. 16, p. 2507, 1990

[4] Karger, J., Ruthven, D. M., "Diffusion in Zeolites and Other Microporous Solids", Wiley, New York, 1992, Chapters 1 & 2. Karger and Ruthven, 1992

[5] Chantong, A., Massoth, F. E., American Institute of Chemical Engineering Journal, No. 29, p. 725, 1983

[6] Chen, Y. D., Yang, R. T., Sun, L. M., Chemical Engineering Science, No. 48, p. 2815, 1993. Karger, Ruthven, op. cit.

[7] Feng, C., Stewart, W. E., Industrial Engineering Chemical Fund., No. 12, p. 143, 1973

[8] Burganos, V. N., Sotirchos, S. V., American Institute of Chemical Engineering Journal, No. 34, p. 1678, 1987; Sotirchos, S. V., Burganos, V. N., American Institute of Chemical Engineering Journal, No. 33, pp. 1106, 1109, 1988

What is claimed is:

1. A method for changing a characteristic of a hardened cement matrix, the method comprising the steps of providing a monomer, a polymer initiator and a solvent for one of the monomer and the polymer initiator, dissolving the one of the monomer and the polymer initiator in the solvent, placing the other one of the monomer and the polymer initiator on an inside of the matrix, infusing the solvent and the monomer or polymer initiator dissolved therein into the matrix under supercritical conditions, and reacting the monomer and the polymer initiator inside the matrix.

2. A method according to claim 1 wherein the step of infusing the solvent under supercritical conditions comprises subjecting the solvent to a temperature and pressure effectively rendering it a supercritical solvent.

3. A method according to claim 2 including the step of adding a second solvent to the first-mentioned solvent to form a mixture, and wherein the step of infusing comprises infusing the mixture into the matrix.

4. A method according to claim 1 including the step of combining the solvent with a second fluid prior to the step of infusing.

5. A method according to claim 4 wherein the step of infusing the solvent under supercritical conditions comprises subjecting the second fluid to a temperature and pressure effectively rendering the second fluid a supercritical fluid to thereby infuse the mixture under supercritical conditions into the matrix.

6. A method according to claim 1 wherein the matrix comprises a hardened cement matrix.

7. A method according to claim 6 including the step of forming the cement matrix from a cement paste and curing the paste into the hardened cement matrix, and including the step of placing the one of the monomer and the polymer initiator in the cement paste prior to the curing step.

8. A method according to claim 7 wherein the step of forming the paste further comprises forming the paste with fly ash, calcium oxide, and vanadium chloride, and wherein at least one of styrene, butadiene and dicyclopentadiene is dissolved in the solvent so that upon infusing the solvent into the matrix reactions occur inside the matrix which render it flexible and ductile.

* * * * *